United States Patent

Mallory

Patent Number: 5,128,964
Date of Patent: Jul. 7, 1992

[54] MODULATION METHOD AND APPARATUS FOR MULTICARRIER DATA TRANSMISSION

[75] Inventor: Mark P. Mallory, Salt Lake City, Utah

[73] Assignee: Intelligent Modem Corporation, Midvale, Utah

[21] Appl. No.: 595,049

[22] Filed: Oct. 10, 1990

[51] Int. Cl.⁵ .............................................. H04L 5/12
[52] U.S. Cl. .................................... 375/39; 375/101; 455/60
[58] Field of Search ................. 375/8, 37, 39, 43, 101; 370/19; 455/60

[56] References Cited

U.S. PATENT DOCUMENTS

| | | | |
|---|---|---|---|
| 3,311,442 | 3/1967 | Jager et al. | 455/60 |
| 3,344,352 | 9/1967 | Dagnet | 455/60 |
| 4,833,706 | 5/1989 | Hughes-Hartogs | 370/19 |

Primary Examiner—Benedict V. Safourek
Assistant Examiner—Young Tse
Attorney, Agent, or Firm—Thorpe, North & Western

[57] ABSTRACT

A high speed modem system which utilizes multiple carriers to successively transmit frames containing data such that the frames are transmitted so that the level of the signal is minimized, and is preferably zero, at the borders between individual frames thus, reducing or eliminating interframe discontinuities and the accompanying distortion and interframe interference. The modem system includes a circuit to successively combine together the modulated carrier signals of each set to produce a frame waveform which includes an inphase signal and a quadrature signal for each carrier signal as is known in the art. The components of the inphase signal and the quadrature signal are grouped to form an I odd/Q even group and an I even/Q odd group. In order to restore the missing components in the I odd/Q even group, the I odd and the Q even components are duplicated and combined with the I odd/Q even group. In order to restore the missing components in the I even/Q odd group, the I even component is negated and used to form the next higher numbered I component and the Q odd component is negated and used to form the next higher numbered Q component. The resulting waveforms are subjected to an Inverse Discrete Fourier Transform function. The resulting imaginary waveform is staggered by one-half frame and then added to the real waveform. The resulting waveform envelope reaches its maximum at each frame boundary thus keeping interframe discontinuities to a minimum and reducing or eliminating interframe interference and distortion.

18 Claims, 3 Drawing Sheets

MODULATION METHOD AND APPARATUS FOR MULTICARRIER DATA TRANSMISSION

BACKGROUND OF THE INVENTION

1. The Field of the Invention

This invention relates to a high speed data modem for transmitting and receiving data over common, band-limited telephone channels and the like, and more particularly to a modulation method and apparatus for multicarrier data transmission which avoids smearing and distortion of the data being transmitted and interframe interference thereby allowing high speed and error free data transmission.

2. The Prior Art

Modems (an acronym for modulation/demodulation) were developed to enable the transmission of digital data over low-grade, but pervasive, analog telephone audio channels. Such channels generally have a bandwidth of less than 3,000 Hz compared to the audio frequency spectrum covering from 20 Hz to 20,000 Hz. With the ability to transmit data over telephone channels, not only was the need for specially designed data transmission networks eliminated, or at least reduced, but also the number of possible originating and destination stations was greatly multiplied, limited only by the availability (or more precisely non-availability) of a telephone line.

Modems operate by transforming binary (two-level) digital data signals into analog signals suitable for transmission over telephone channels and then, after transmission, transforming the analog signals back into the digital data signals. This conversion involves modulating or encoding the digital data onto a carrier signal, or carrier signals, at the transmitting end, and demodulating or decoding the transmitted signals at the receiving end to recover the desired digital data.

Since the introduction of modems, development efforts have been directed to improving their speed and accuracy, resulting in systems capable of transmitting 9600 bits per second (see, for example, U.S. Pat. Nos. 4,206,320 and 4,771,417) and, most recently, 14,400 bits per second (see U.S. Pat. No. 4,646,305). Also see U.S. Pat. Nos. 3,955,141, 4,085,449, 4,355,397, 4,514,825, 4,653,044, 4,686,690, 4,734,920 and 4,796,279.

Among the currently used methods of data transmission over telephone lines are those which simultaneously utilize several carriers. Such multiple carrier data transmission techniques are attractive for a number of reasons. For example, multiple carrier techniques allow the most efficient use of the available bandwidth, especially when signal/noise ratios vary across the passband of the communication channel. Also, as the performance of digital signal processors increase and their prices decrease, multi-carrier modulation systems become more attractive alternatives to other systems.

One of the problems which inhibits improvement in the speed and accuracy of data transmission over telephone channels, at least for those systems which utilize multiple carriers (frequencies), is what is denoted "group delay distortion". This type of distortion comes about because of the difference in phase delay for different frequencies on communication channels. The result of such distortion is that different frequencies of a transmitted composite analog signal arrive at the receiving end at different times, some frequencies lagging behind others, so that one signal symbol or frame may interfere with an immediately preceding or succeeding symbol, e.g., the late arriving frequencies of a symbol interfering with the early arising frequencies of a succeeding symbol.

Another problem of systems which utilize multiple carriers arises from the fact that the symbol waveforms (transmitted composite analog signal) are periodic and thus, if transmitted continuously, one immediately after the other, give rise most times to sharp discontinuities between symbols. These discontinuities, in turn, produce severe distortion (from the harmonics of the discontinuity) in the succeeding symbol.

Even in the case of multicarrier QAM (quadrature amplitude modulation) the problem of smearing between frames and interframe interference caused by interframe discontinuities and group delay can be severe. In QAM, successive bits to be transmitted are converted (through a straight binary code, gray code, or other means) into a number of multilevel signals. Each transmitted signal is made up of an inphase (cosine) component and a quadrature (sine) component; thus, the total number of multilevel signals transmitted is equal to twice the number of carrier frequencies.

When using QAM, in order to maintain orthogonality of the carriers, the amplitude of each must remain constant for a period equal to the reciprocal of the frequency difference between adjacent carriers; this period is referred to as a "frame". Importantly, when demodulating the QAM signal, the received signal must be integrated for precisely one frame period in order to separate the individual carrier components.

While the integration must be carried out precisely on each frame, when the signal is transmitted through a communications channel, the beginning and the end of the frame are "smeared" in time due to the inadequate channel transient response. Smearing has two effects: First, time domain components of the frame located near it's boundaries are not properly included in the frame integration, causing loss of orthogonality between carriers or intercarrier interference, as well as a loss in amplitude response; and, Second, time domain components of adjacent frames near the boundaries are improperly be included in the frame integration, causing interframe interference.

One approach to overcoming these problems is described in U.S. Pat. No. 4,206,320 for example, is to provide a gap or guard time between symbols to thus reduce intersymbol and discontinuity distortion. That is, the demodulator at the receiving end is arranged to ignore the received signal for a portion of the baud time. Of course, this also increases the transmission time (i.e., increases delay) which, stated in other words, decreases the transmission rate.

Another approach to solving the problems experienced in the prior art is described in U.S. Pat. No. 4,943,980. U.S. Pat. No. 4,943,980 the rotation of, or circularly shifting of, each frame waveform in such a manner as to minimize the discontinuities between frames, and thus minimizing the effects of the channel transient response. This approach may not be effectively carried out for all possible frame waveforms, and even if it can be, there remains the requirement for conveying the amount of rotation of each frame to the receiver. Since information conveying the amount of the rotation of each waveform must be sent at the expense of the data to be transmitted, there is again a loss in channel capacity. U.S. Pat. No. 4,943,980 discloses an apparatus and method for a high speed modem which overcomes the above described problems but utilizes a frame rotation scheme where the amount that each frame is rotated must be conveyed from the transmitter to the receiver.

BRIEF SUMMARY AND OBJECTS OF THE INVENTION

It is an object of the invention to provide an improved system and method for high speed and reliable transmission of data over telephone channels.

It is another object of the invention to provide a modulation method and apparatus for multicarrier data transmission over a communications channel wherein the discontinuities between frames of data are minimized.

It is a further object of the invention to provide a modulation method and apparatus for multicarrier data transmission over a communications channel wherein interframe interference and distortion of the data is reduced without introducing delay or reducing the transmission rate.

These and other objects and advantages of the invention will become more fully apparent from the description and claims which follow, or may be learned by the practice of the invention.

The above and other objects of the invention are realized in a specific illustrative embodiment of a multicarrier high speed modem which provides that bundles of data, known as frames, are transmitted such that the level of the signal is minimized, and preferably zero, at the borders between individual frames thus, reducing or eliminating interframe discontinuities and the undesirable distortion caused thereby.

The digital data modulation method of the present invention utilizes, in a preferred embodiment, means for generating sets of carrier signals, each carrier signal of a set having a frequency different from the frequency of every other carrier signal of the set. A means for modulating each carrier signal of a set with a different portion of the digital data is also provided in the preferred embodiments of the apparatus.

A means for successively combining together the modulated carrier signals of each set to produce a frame waveform is included in the illustrative embodiment. The frame waveform of the present invention includes an inphase signal and a quadrature signal for each carrier signal as is known in the art. Nevertheless, the inphase signal, referred to as the I signal, and the quadrature signal, referred to as the Q signal, are processed in accordance with the present invention to eliminate, or reduce to an insignificant level interframe interference, and distortion caused by discontinuities in the levels of signals represented from one frame to an adjacent frame.

The components of the inphase I signal and the quadrature Q signal are manipulated in order to minimize the level of the signal at the boundary of each frame. A means is provided for grouping the components of the inphase signal and the quadrature signal to form an I odd/Q even group and an I even/Q odd group. In each of these two new groups (I odd/Q even and I even/Q odd), successive frequency components alternate between an inphase condition I and a quadrature condition Q, resulting in only half of the original components being present in each of the new groups. In order to restore the missing components in the I odd/Q even group, a means for duplicating the I odd component and forming the next higher numbered I component and for duplicating the Q even component present and forming the next higher numbered Q component with the duplicated Q component. In order to restore the missing components in the I even/Q odd group, a means for negating the I even component and forming the next higher numbered I component and for negating the Q odd component present and forming the next higher numbered Q component with the negated Q component.

A means for transforming pursuant to an Inverse Discrete Fourier Transform function, from a frequency domain signal to a time domain signal is utilized to produce two output signals: a real waveform and an imaginary waveform. The real waveform has an envelope shape which resembles a sine wave and which tapers to zero at the frame boundary. The imaginary waveform has an envelope shape which resembles a cosine wave and which is at a minimum in the middle of the frame and reaches a maximum level at the frame boundary. In order to move the minimum level, e.g., zero, to the frame boundary, a means for staggering the imaginary waveform, relative to the real waveform, by introducing a one-half frame delay is placed in the imaginary waveform signal path resulting in a staggered imaginary waveform.

A means for adding the staggered imaginary waveform and the real waveform is next placed in the signal path and then the combined waveforms are applied to a means for successively and continuously transmitting the combined imaginary and real waveforms from a transmitting station to a receiving station over a communication channel. The various functions of the described embodiment can be carried out using discrete circuits as well as a modern microprocessor.

At a receiver connected to a communication channel, such as a telephone line, the preferred embodiments of the present invention include a means for receiving the transmitted waveforms. A means for inverting the one-half frame staggered introduced into the imaginary component of the transmitted signal is provided to bring the signal back into synchronization. The synchronized signal is subjected to a means for transforming each waveform, pursuant to a Discrete Fourier Transform function, from a time domain signal to a frequency domain signal having a real waveform and an imaginary waveform. In order to output a digital signal which reconstructs the original digital data, a means for demodulating the received waveform to recover the digital data information is provided.

BRIEF DESCRIPTION OF THE DRAWINGS

In order that the manner in which the above-recited and other advantages and objects of the invention are obtained can be appreciated, a more particular description of the invention briefly described above will be rendered by reference to a specific embodiment thereof which is illustrated in the appended drawings. Understanding that these drawings and this description depict only a typical embodiment of the invention and are not therefore to be considered limiting of its scope, the invention will be described and explained with additional specificity and detail through the use of the accompanying drawings in which.

DETAILED DESCRIPTION OF THE PREFERRED EMBODIMENT

The system of the present invention, as indicated earlier, is designed for the transmission of digital data over conventional telephone channels such as would be available on a switched telephone network. A specific illustrative embodiment of the system of the present invention allows for transmission at a high speed by employing sets or frames of constant frequency carrier signals. The carrier signals are amplitude and phase modulated to encode them with binary data. The frequency spacing between carrier signals is the reciprocal of the frame period. After modulation, the carrier signals of a frame are summed to obtain a frame waveform for ultimate transmission to a receiving station where the digital data may be recovered.

1. General Discussion of the presently preferred method of the invention.

Figure 1:
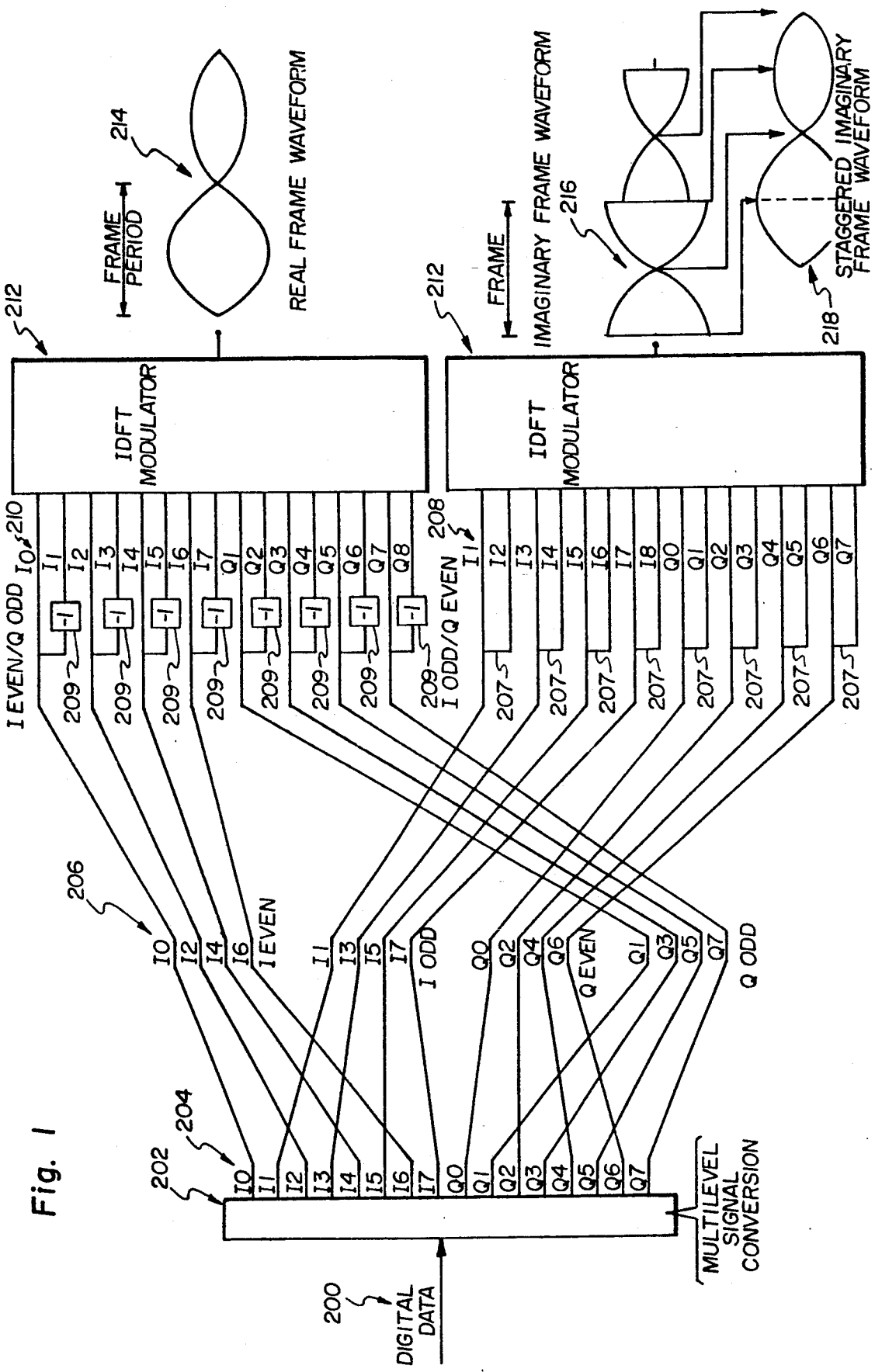
FIG. 1 is a high level general diagram illustrating the modulation method and apparatus of the present invention.

As indicated earlier, the present invention includes a method of transmitting information over communication channels using multiple carrier signals. FIG. 1 provides a simplified diagram representing the presently preferred method of the present invention which can be used in a number of multicarrier information transmission systems.

Represented in FIG. 1 is digital data 200 being input to a multilevel signal conversion device 202. The input to the multilevel signal conversion device 202 can be serial or parallel data or even analog information. The multilevel signal conversion device 202 receives an input and outputs a plurality of baseband signals derived from the input, each of the baseband signals containing a portion of the input information.

Each baseband signal 204 is designated as an I baseband signal or a Q baseband signal. Each I baseband signal and each Q baseband signal is successively designated with a number so that the Q baseband signals are individually designated as even numbered Q baseband signals or odd numbered Q baseband signals and so that the I baseband signals are individually designated as even numbered I baseband signals or odd numbered Q baseband signals.

The baseband signals are then grouped as indicated at 206 using means which are available in the art. The grouping takes place as follows: I odd and Q even are grouped to organize an I odd and Q even group comprised of odd numbered I baseband signals and even numbered Q baseband signals; and, I even and Q odd are grouped to organize an I even/Q odd group comprised of even numbered I baseband signals and odd numbered Q baseband signals.

Next, the missing components are restored in each of the groups as represented at 208 and 210. In the case of the group containing I odd and Q even components, as represented at 208, the missing even numbered I baseband signals and the missing odd numbered Q baseband signals in the I odd/Q even group are restored by duplicating each of the odd numbered I baseband signals and the each of the even numbered Q baseband signals (represented at the parallel lines 207) to form the next higher numbered I and Q signals. This results in both I odd, I even, Q odd, and Q even components being organized as an imaginary baseband signal group.

In the case of the group containing I even and Q odd components, as represented at 210, the missing odd numbered I baseband signals and the even numbered Q baseband signals in the I even/Q odd group are restored by negating (multiplying by a $-1$ as represented at boxes 209) each of the even numbered I baseband signals and the each of the odd numbered Q baseband signals to form the next higher numbered I and Q signals. This results in both I odd, I even, Q odd, and Q even components being organized as a real baseband signal group.

Continuing to refer to FIG. 1, each of the components are used to modulate a carrier signal using, preferably, an Inverse Discrete Fourier Transform function as represented at 212. The means for generating a plurality of carrier signals is not explicitly represented in FIG. 1 but can be supplied by one skilled in the art. The IDFT process is one example of a means for modulating a carrier signal. Each of the carrier signals should have a frequency different from the frequency of the other carrier signals, and the frequency difference between adjacent carrier signal should be equal to substantially the reciprocal of the period of the signal frame.

The output of the IDFT processors 212 results in a real frame waveform 214 or an imaginary frame waveform 216. The real frame waveform 214 has a sine wave envelope level which is at a substantially zero value at the frame boundary. The imaginary frame waveform 216 has a cosine wave envelope level which is at a substantially maximum value at the frame boundary.

In order to avoid a discontinuity at the imaginary frame boundary, the imaginary frame waveform is staggered, or delayed, to form a staggered imaginary frame waveform 218 which is delayed one half frame period relative to the real frame waveform. By delaying the imaginary frame waveform, the envelope level of the resulting staggered imaginary frame waveform becomes substantially zero at the imaginary frame boundary and frame discontinuities are avoided. Preferably, the staggered imaginary frame waveform is formed by delaying the first half of the imaginary frame waveform by one frame period. Alternatively, the staggered imaginary frame waveform can be formed by advancing the second half of the imaginary frame waveform by one frame period. The staggered imaginary frame waveform and the real frame waveform are added together and transmitted on a communication channel. A similar, but inverted, method is used at the receiver to recover the transmitted information.

2. Description of a preferred specific embodiment of the invention.

Figure 2:
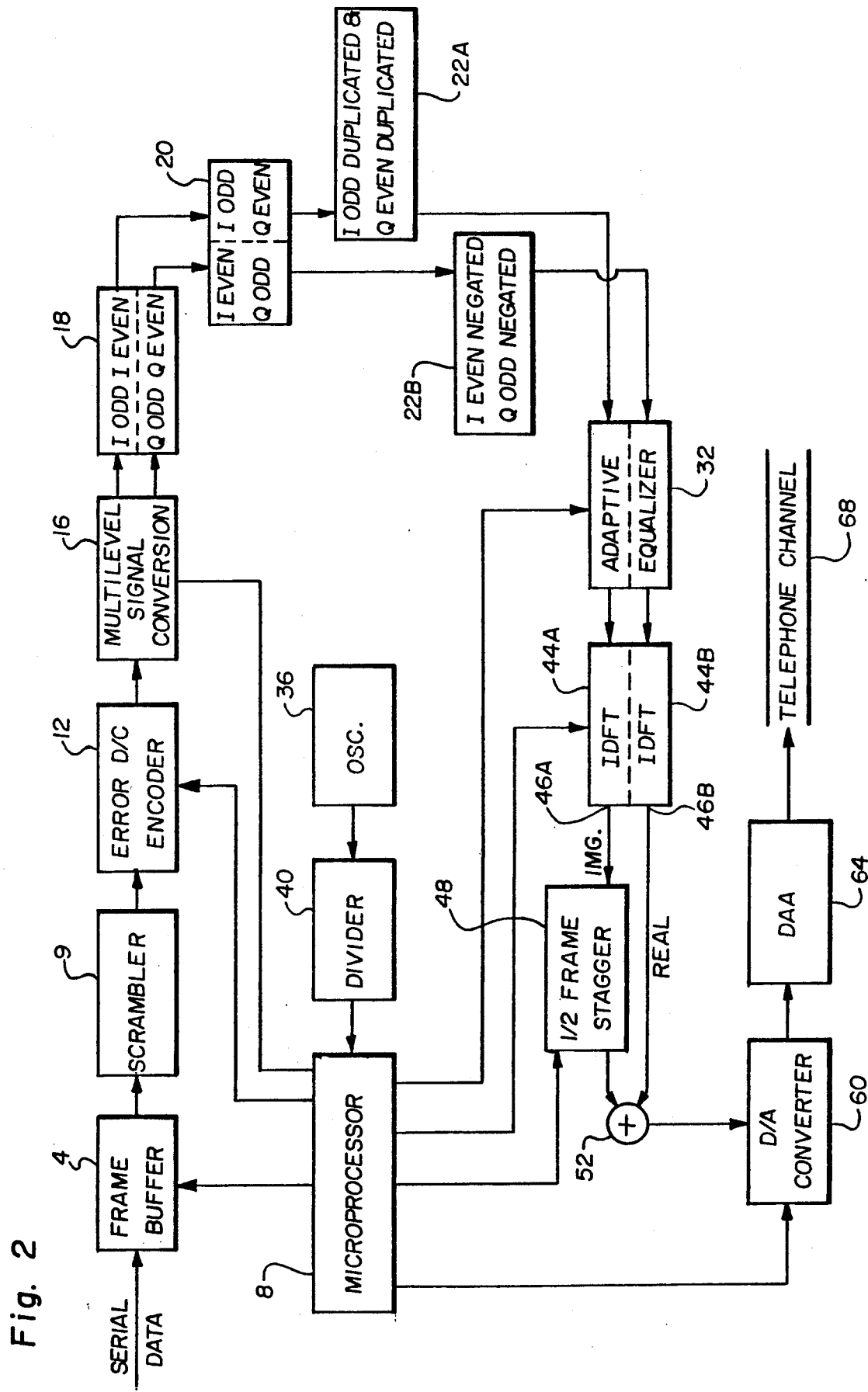
FIG. 2 is a diagram of a modem transmitter implementing the modulation method for multicarrier data transmission in accordance with the present invention.

FIG. 2 illustrates one specific embodiment of a modem transmitter using the modulation method of the present invention. The transmitter includes a frame buffer 4 for receiving, temporarily storing, and grouping or framing input serial binary data. The grouping or framing of the input data is carried out under the control of a microprocessor 8 which, for example, could be a Texas Instruments DSP integrated circuit 320C255, or another microprocessor which can be chosen by one skilled in the art. It will be appreciated that the microprocessor 8 preferably directs the operations of the other apparatus components and that many of the functions represented in the figures can be carried out by a microprocessor without the need for discrete dedicated circuits.

The frame buffer 4 unloads its stored data, a frame at a time, to a scrambler 9 which randomizes the data in a well known manner to avoid transmission of long sequences of constant or nonvarying data. The scrambled data is supplied to an error detection/correction encoder 12 which adds redundant bits for purposes of error detection and correction.

The error detection and correction encoding could be carried out using a variety of well known encoding techniques, such as block parity or convolutional encoding. Although the encoding function, as well as the scrambler function, is shown as being carried out by individual units, such functions could also be carried out by the microprocessor 8.

The method of the present invention eliminates the problems which are caused by interframe discontinuities. The present invention solves the problems present in the prior art by ensuring that the waveform transmitted on the communication channel smoothly tapers to zero at the beginning and end of each frame. While the present invention is not conventional quadrature amplitude modulation, its implementation does have similarities to QAM and the many of the teachings used in a QAM based system have application with the present invention.

Referring again to FIG. 2 at 16, successive bits of data to be transmitted over the communication channel are converted into a number of multilevel signals which are then used to modulate multiple carrier frequencies resulting in an inphase and quadrature components for each carrier frequency. The conversion into a number of multilevel signals can be carried out as in QAM bas systems. QAM modulation is also well known; see, for example, U.S. Pat. No. 4,085,449. As in QAM, after the multilevel conversion is carried out, the signal can be grouped into inphase (I) and quadrature (Q) components.

As represented at 18 in FIG. 2, the inphase I and quadrature Q components are further divided into odd and even numbered components, resulting in four groups: I odd, I even, Q odd and Q even. Next, as represented at 20, the I even and Q odd groups are recombined and the I odd and Q even subgroups are recombined, resulting in two new groups of signals: I even/Q odd and I odd/Q even.

It can be seen that in each of these two new groups (I even/Q odd and I odd/Q even), successive frequency components alternate between I and Q, resulting in only half of the original components being present. As represented at 22A and 22B in FIG. 2, the missing components in each group ar restored.

In the case of I odd/Q even (block 22A) each I component present is duplicated to create the next higher numbered I component, and each Q component present is duplicated to create the next higher numbered Q component. The I and Q components already present remain unchanged.

In the case of I even/Q odd group (Block 22B), each I component present is negated to create the next higher numbered I component, and each Q component present is negated to create the next higher numbered Q component. The I and Q components already present remain unchanged.

It will be appreciated that the described apparatus and method of the present is carried out with digital signals which will later, as will be described, be converted to an analog signal for transmission on the communications channel.

The resulting I odd/Q even group and I even/Q odd group can desirably be adaptively equalized as represented at 32 in FIG. 2. Adaptive equalizer 32 "predistorts" the I odd /Q even signal and the I even Q/odd signal to be transmitted on the communication channel to compensate for the attenuation effects of typical telephone communication channels. This predistortion involves changing amplitudes of the carrier frequency signals to account beforehand of amplitude distortion which will occur on a telephone communication channel. In effect, the average attenuation as a function of frequency for a communication channel can be determined and the inverse of this function is multiplied with each real and imaginary component of the modulated signals so that after transmission and the expected attenuation, the receiver will receive frequency signals which are closer to those transmitted than would be the case without the predistortion.

The two groups (I odd/Q even and I even/Q odd) of frequency components are subjected to two separate Inverse Discrete Fourier Transform (IDFT) processors 44A and 44B which results in two separate frame waveforms. The Inverse Fast Fourier Transform processors 44A and 44B convert the signals applied to it from the frequency domain to the time domain. The Inverse Fourier Transform technique applied in this described example of the present invention can be similar to that used in known QAM techniques and results in a periodic signal.

While two IDFT processors are represented in FIG. 2, it is preferred that the two operations be performed by a single complex IDFT. A complex IDFT produces two sets of output signals, a first output signal referred to as "real" and a second output signal referred to as "imaginary."

When a complex IDFT is used, the frame waveform corresponding to the I even/Q odd frequency components appears at the real IDFT output 46B, and the frame waveform corresponding to the I odd/Q even components appears at the imaginary IDFT output 46A. These two frame waveforms will be referred to herein as the real frame waveform and imaginary frame waveform, respectively.

The separation and duplication of the frequency components provides the significant advantages of the present invention as will now be discussed. For purposes of discussion, consider the case where only one I even frequency component is initially present. This I even component will be negated to create the next higher frequency component (see 22B in FIG. 2). When the I even component and the negated I even component are subjected to the IDFT process 44B, the resulting time domain frame waveform (real frame) will be two cosine waves of opposite phase, differing in frequency by the reciprocal of the frame period.

Because of the phase relationship between the cosine waves in the time domain waveform which appears at the real IDFT output 46B, the cosine waves will cancel each other at the beginning and end of the frame, but will reinforce each other in the middle of the frame. The real signal envelope appears as a half cycle of a sine wave, i.e., smoothly tapering to zero at the frame boundaries. This sinusoidal envelope will multiply all components of the real frame waveform.

Because of the sinusoidal envelope which smoothly tapers to zero at the frame boundaries, the amount of signal energy near the frame boundaries is greatly reduced from that which is experienced by prior art techniques. Therefore the aforementioned effects of channel transient response with regard to intersymbol and intercarrier interference and amplitude response will be greatly reduced.

The frame waveform corresponding to the I odd/Q even components which appears at the imaginary IDFT output 46A, i.e., the imaginary frame waveform, is also multiplied by a sinusoidal envelope. However, since the adjacent frequency components are in phase, the envelope will be maximum at the frame boundaries, tapering to zero in the middle of the frame. Having the maximum levels at the frame boundaries is undesirable since interframe interference and undesirable transient response effects are also maximized.

In order to eliminate the undesirable effects of having the waveform envelope at a maximum at the frame boundaries, the imaginary frame waveform is divided in half and the first half of the frame is delayed by one frame period as represented at 48 in FIG. 2. The resulting imaginary frame waveform has an envelope identical to the real frame waveform (smoothly tapering to zero at the frame boundaries) which is staggered by one half frame period.

The resulting half frame stagger results in the imaginary frame envelope being at a maximum when the real frame envelope is minimum, providing a more efficient time utilization of the channel and improving the peak to average power ratio. Staggering the frames is also necessary to maintain orthogonality between all of the component signals.

Again, although the equalization, IDFT, grouping, and staggered functions are shown as being carried out by individual circuits these functions could all be performed by the microprocessor 8 if desired.

The real frame waveform and the staggered imaginary frame waveform are now added together at adder 52 to form a composite frame signal. The composite frame signal produced by adder 52 is supplied to a digital to analog converter 60 which produces an analog waveform representation of each frame signal suitable for transmission over a telephone channel. The digital to analog converter 60 supplies the waveform to a data access arrangement (DAA) circuit 64 which connects the transmitter of FIG. 2 to a telephone channel 68. The DAA circuit 64 includes circuitry necessary for interfacing with the telephone system for among other things, protection of the system, and is of conventional design.

Real frames and imaginary frames are each transmitted onto the telephone channel 68 in succession, with each boundary between real frames occurring at a midpoint of an imaginary frame and each boundary between each imaginary frames occurring at a midpoint of a real frame. In this way, the problems of interframe interference and the discontinuities between frames of data are minimized without introducing delay or reducing the transmission rate.

Figure 3:
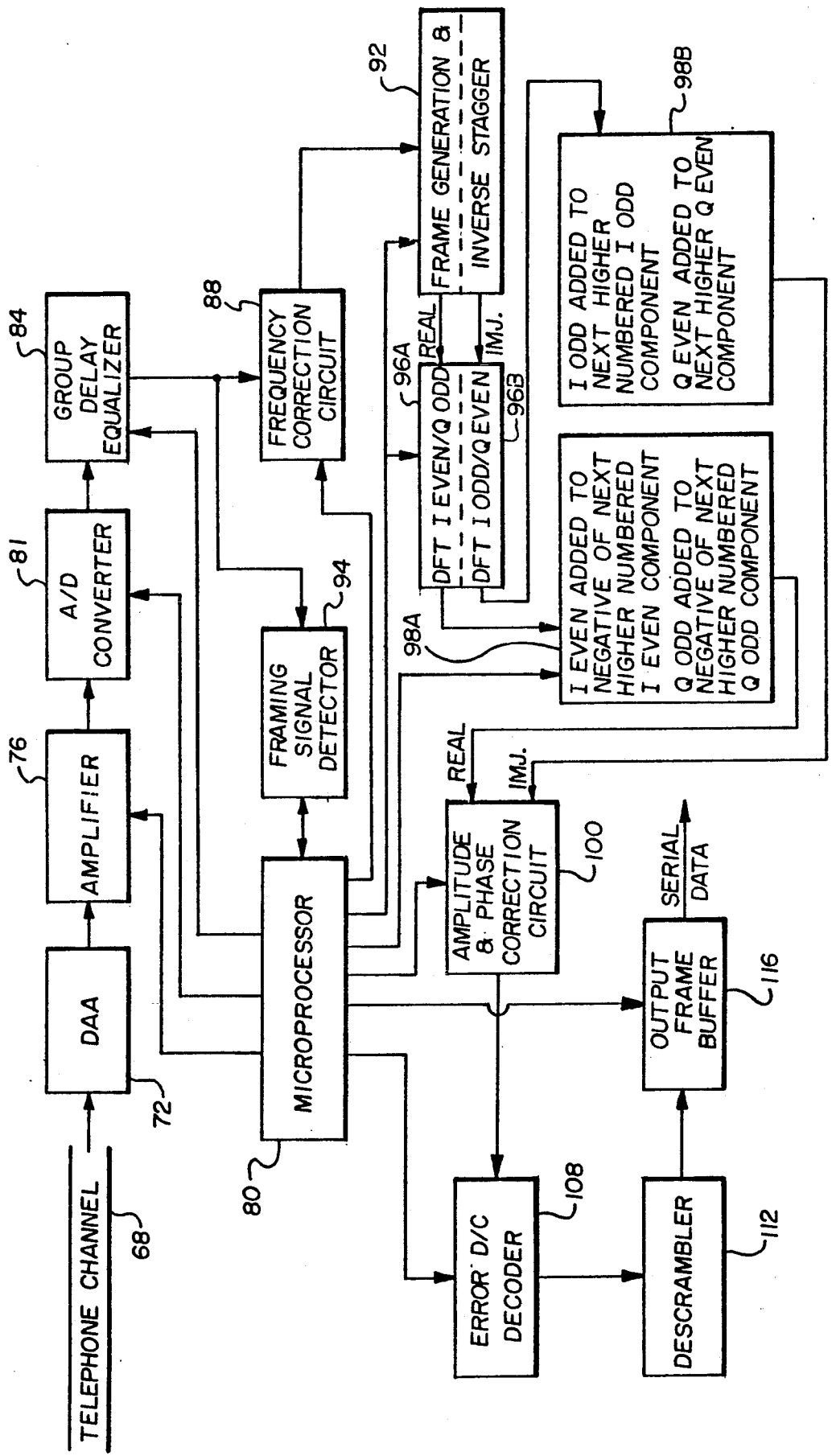
FIG. 3 is a diagram of a modem receiver implementing the demodulation method for multicarrier data transmission in accordance with the present invention.

FIG. 3 illustrates one specific embodiment of a modem receiver using the modulation method of the present invention. The receiver includes a data access arrangement (DAA) circuit 72 for connecting the rest of the receiver circuitry to the telephone channel 68 from which data signals are received. The DAA circuit 72 supplies received signals to a digitally controlled amplifier 76 whose gain is determined by a digital input received from a microprocessor 80. The microprocessor 80, as with the microprocessor 8 of FIG. 2, could advantageously be a Texas Instruments' DSP chip 320C255 but other microprocessors could also be used.

The amplifier 76 amplifies the received signal to a level required by an analog to digital converter (A/D Converter) 81 to which the amplifier supplies the received signal. This is done by calculating the energy level of a previously converted set of samples from a frame waveform and then computing a new gain value for the next frame waveform. The gain of the amplifier 76 is preferably only changed at frame transition times, i.e., between frames. The analog to digital convertor 80 band limits the incoming signal and converts it to a sequence of digital values at an appropriate sampling rate, determined by a sampling strobe received from the microprocessor 8.

The sampled digital signals are preferably supplied to a group delay equalizer circuit 84 which removes the effects of any group delay from a received symbol or frame. Such equalization is well known and is typically carried out by determining from earlier transmission of training frames of known phase what type of delay will occur for the different frequencies transmitted.

The received signals are then supplied to a frequency correction circuit 88 which, in a conventional fashion, corrects for any frequency offsets and phase errors which may have occurred in the signals during transmission. The framing signal detector 94 preferably signals the microprocessor 80 to indicate the beginning and ending of each frame. The frequency corrected data is supplied by the frequency correction circuit 88 to a frame generation and inverse stagger circuit 92.

The frame generation process redivides the received signal into frames, corresponding to the real frames generated at the transmitter. The inverse stagger process takes the second half of each frame and combines it with the first half of the next frame to form an imaginary frame (this is the inverse of the stagger operation 48 represented in FIG. 2).

The real and imaginary frame waveforms are next applied to two separate Discrete Fourier Transform processes 96A and 96B which demodulate the carriers and recovers two groups of frequency components. The two Discrete Fourier Transform processors 96A and 96B can preferably be performed by a single complex Discrete Fourier Transform processor, in a manner similar to the use of a single complex Inverse Discrete Fourier Transform processor in the transmitter as described in connection with 44A and 44B in FIG. 2.

Similarly to the Inverse Discrete Fourier Transform process used in the transmission of data, the imaginary Discrete Fourier Transform 96B demodulates I odd/Q even components, and the real Discrete Fourier Transform 96A demodulates I even Q odd components. Even after demodulation of the real and imaginary components, however, there are additional frequency components at the Discrete Fourier Transform outputs (corresponding to crosstalk between frames) which must be removed. The following steps are preferably used to separate out the desired component signals and cancel the crosstalk signals: In the case of the output of the imaginary Discrete Fourier Transform 96B, each demodulated I odd component is added to the next higher numbered I component to recover the I odd component (98B in FIG. 3) and each demodulated Q eve component is added to the next higher numbered Q component to recover the Q even component (98B in FIG. 3).

In the case of the output of the real Discrete Fourier Transform 96A, each demodulated I even component is added to the negative of the next higher numbered I component to recover the I even component (98A in FIG. 3) and each demodulated Q odd component is added to the negative of the next higher numbered Q component to recover the Q odd component (98A in FIG. 3).

After carrying out the processes represented at 98A and 98B in FIG. 3, the original I and Q, odd and even frequency component signals have been recovered. The recovered multilevel signs are converted to binary data using the same techniques as employed for multicarrier QAM.

The demodulated recovered signals are next preferably supplied to an amplitude and phase correction circuit 100. This circuit, in a conventional fashion, corrects the amplitude and phase of the received signals by an amount determined from training signal waveforms initially transmitted. This correction may be implemented in the form of a look-up table developed from the initial training sequences transmitted.

The demodulated recovered signals are then preferably supplied to an error detection/correction decoder 108 to determine and correct for any bit errors and the resulting data words are supplied to a descrambler 112. The descrambler 112 performs the opposite of the scrambling function performed at the transmitter, to recover the true data bits which were to be transmitted. The data is then supplied to an output frame buffer 116 which performs the inverse of the frame buffer 4 represented in FIG. 2, i.e., unblocks the data, and then supplies the data as a serial bit stream to a receiving or utilization device (not shown).

In the manner described, a modem system is provided where no delays or gaps need be inserted between symbols or frames of transmitted data and thus the delay which would otherwise be incurred is avoided. Intersymbol or interframe interference, which is generally caused by sending a sequence of frames where the amplitude between frames abruptly changes, is also avoided by having a signal level at a minimum at each frame boundary.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications, arrangements, and any equivalents thereof.

What is claimed and desired to be secured by United States Letters Patent is:

1. A system for transmitting information over a communication channel, the system comprising:
   means for outputting a plurality of baseband signals comprising a signal frame derived from an input of at least one information carrying input signal, each baseband signal designated as an I baseband signal or a Q baseband signal, each I baseband signal and each Q baseband signal being successively designated with a number so that the Q baseband signals are individually designated as even numbered Q baseband signals or odd numbered Q baseband signals and so that the I baseband signals are individually designated as even numbered I baseband signals or odd numbered baseband signals;
   means for grouping the odd numbered I baseband signals, the even numbered I baseband signals, the odd numbered Q baseband signals, and the even numbered Q baseband signals to form an
   I odd/Q even group comprised of odd numbered I baseband signals and even numbered Q baseband signals and an
   I even/Q odd group comprised of even numbered I baseband signals and odd numbered Q baseband signals;
   means for restoring the missing even numbered I baseband signals and the odd numbered Q baseband signals in the I odd / Q even group by duplicating each of the odd numbered I baseband signals to form the next higher numbered baseband signal and by duplicating each of the even numbered Q baseband signals to form the next higher numbered Q baseband signal, resulting in both I odd, I even, Q odd, and Q even components being organized as an imaginary baseband signal group;
   means for restoring the missing odd numbered I baseband signals and the even numbered Q baseband signals in the I even / Q odd group by negating each of the even numbered I baseband signals to form the next higher numbered baseband signal and by negating each of the odd numbered Q baseband signals to form the next higher numbered Q baseband signal, resulting in both I odd, I even, Q odd, and Q even components being organized as an real baseband signal group;
   means for generating a plurality of carrier signals, each of the plurality of carrier signals having a frequency different from the frequency of the other carrier signals, and the frequency difference between adjacent carrier signals is equal to substantially the reciprocal of the period of the signal frame;
   means for (a) modulating a carrier signal with one of the signals from the imaginary baseband signal group to form an imaginary frame waveform and for (b) modulating each carrier signal with one of the signals from the real baseband signal group to form a real frame waveform, the real frame waveform having a sine wave envelope level which is at a substantially zero value at the frame boundary and the imaginary frame waveform having a cosine wave envelope level which is at a substantially maximum value at the frame boundary;
   means for staggering the imaginary frame waveform to form a staggered imaginary frame waveform which is delayed one half frame period relative to the real frame waveform so that the envelope level of the staggered imaginary frame waveform is substantially zero at the imaginary frame boundary;
   means for adding together the staggered imaginary frame waveform and the real frame waveform; and
   means for transmitting the added imaginary frame waveform and the real frame waveform onto a communication channel.

2. A system for transmitting digital data information over a communication channel as claimed in claim 1 wherein the means for outputting comprises means for receiving serial data signals.

3. A system for transmitting digital data information over a communication channel as claimed in claim 1 wherein the I baseband signal comprises an inphase signal and the Q baseband signal comprises a quadrature signal.

4. A system for transmitting digital data information over a communication channel as claimed in claim 1 wherein each carrier signal is an integer multiple of the reciprocal of the period of the frame.

5. A system for transmitting digital data information over a communication channel as claimed in claim 1 wherein the means for modulating comprises means for carrying out an Inverse Discrete Fourier Transform function.

6. A system for transmitting digital data information over a communication channel and further for receiving the digital data which was transmitted over the communication channel as claimed in claim 1 wherein the communication channel comprises a telephone line.

7. A system for transmitting digital data information over a communication channel as claimed in claim 1 wherein the means for grouping, the means for restoring, and the means for modulating a carrier signal comprise a microprocessor.

8. A system for transmitting digital data information over a communication channel as claimed in claim 1 wherein the means for modulating a carrier signal comprises a microprocessor.

9. A system for transmitting digital data information over a communication channel as claimed in claim 1 further comprising:
   means for receiving the transmitted imaginary frame waveform and the real frame waveform;
   means for inverting the one-half frame delay in the staggered imaginary frame waveform present in the received imaginary frame waveform;
   means for (a) demodulating the carrier signals which were modulated with one of the signals from the imaginary baseband signal group to obtain a demodulated imaginary signal and for (b) demodulating the carrier signals which were modulated with one of the signals from the real baseband signal group to obtain a demodulated real signal;
   means for removing the restored I even and I odd signals and the restored Q odd and Q even signals from the demodulated imaginary and real signals; and
   means for outputting digital data contained in the demodulated imaginary and real signals.

10. A modem system for transmitting digital data information over a communication channel such as a telephone line or the like comprising:
   means for outputting a plurality of baseband signals comprising a signal frame derived from an input of at least one information carrying input signal, each baseband signal designated as an I baseband signal or a Q baseband signal, each I baseband signal and each Q baseband signal being successively designated with a number so that the Q baseband signals are individually designated as even numbered Q baseband signals or odd numbered Q baseband signals and so that the I baseband signals re individually designated as even numbered I baseband signals or odd numbered baseband signals;
   means for grouping the odd numbered I baseband signals, the even numbered I baseband signals, the odd numbered Q baseband signals, and the even numbered Q baseband signals to form an
   I odd/Q even group comprised of odd numbered I baseband signals and even numbered Q baseband signals and an
   I even/Q odd group comprised of even numbered I baseband signals and odd numbered Q baseband signals;
   means for restoring the missing even numbered I baseband signals and the odd numbered Q baseband signals in the I odd / Q even group by duplicating each of the odd numbered I baseband signals to form the next higher numbered baseband signal and by duplicating each of the even numbered Q baseband signals to form the next higher numbered Q baseband signal, resulting in both I odd, I even, Q odd, and Q even components being organized as an imaginary baseband signal group;
   means for restoring the missing odd numbered I baseband signals and the even numbered Q baseband signals in the I even / Q odd group by negating each of the even numbered I baseband signals to form the next higher numbered baseband signal and by negating each of the odd numbered Q baseband signals to form the next higher numbered Q baseband signal, resulting in both I odd, I even, Q odd, and Q even components being organized as an real baseband signal group;
   means for generating a plurality of carrier signals, each of the plurality of carrier signals having a frequency different from the frequency of the other carrier signals, and the frequency difference between adjacent carrier signals is equal to substantially the reciprocal of the period of the signal frame;
   means for (a) modulating a carrier signal with one of the signals from the imaginary baseband signal group to form an imaginary frame waveform and for (b) modulating each carrier signal with one of the signals from the real baseband signal group to form a real frame waveform, the real frame waveform having a sine wave envelope level which is at a substantially zero value at the frame boundary and the imaginary frame waveform having a cosine wave envelope level which is at a substantially maximum value at the frame boundary;
   means for staggering the imaginary frame waveform to form a staggered imaginary frame waveform which is delayed one half frame period relative to the frame waveform so that the envelope level of the staggered imaginary frame waveform is at substantially zero at the imaginary frame boundary;
   means for adding together the staggered imaginary frame waveform and the real frame waveform;
   means for transmitting the added imaginary frame waveform and the real frame waveform onto a communication channel;
   means for receiving the transmitted imaginary frame waveform and the real frame waveform;
   means for inverting the one-half frame delay in the staggered imaginary frame waveform present in the received imaginary frame waveform;
   means for (a) demodulating the carrier signals which were modulated with one of the signals from the imaginary baseband signal group to obtain a demodulated imaginary signal and for (b) demodulating the carrier signals which were modulated with one of the signals from the real baseband signal group to obtain a demodulated real signal;
   means for removing the restored I even and I odd signals and the restored Q odd and Q even signals form the demodulated imaginary and real signals; and
   means for outputting digital data contained in the demodulated imaginary and real signals.

11. A modem system for transmitting digital data information over a communication channel such as a telephone line or the like as claimed in claim 10 wherein the means for outputting comprises means for receiving a serial data signal.

12. A modem system for transmitting digital data information over a communication channel such as a telephone line or the like as claimed in claim 10 wherein the I baseband signal comprises an inphase signal and the Q baseband signal comprises a quadrature signal.

13. A modem system for transmitting digital data information over a communication channel such as a telephone line or the like as claimed in claim 11 wherein each carrier signal is an integer multiple of the reciprocal of the period of the frame.

14. A modem system for transmitting digital data information over a communication channel such as a telephone line or the like as claimed in claim 10 wherein the means for modulating comprises means for carrying out an Inverse Fourier Transform function.

15. A modem system for transmitting digital data information over a communication channel such as a telephone line or the like as claimed in claim 10 wherein the means for demodulating comprises means for carrying out a Fourier Transform function.

16. A system for transmitting digital data information over a communication channel as claimed in claim 10 wherein the means for grouping, the means for restoring, the means for modulating, and the means for demodulating comprise a microprocessor.

17. A system for transmitting digital data information over a communication channel as claimed in claim 10 wherein the means for modulating a carrier signal and the means for demodulating comprises a microprocessor.

18. A method of transmitting digital data from a first station through a communication channel to a second station comprising the steps of:
outputting a plurality of baseband signals comprising a signal frame and derived from an input of at least one information carrying input signal, each baseband signal designated as an I baseband signal or a Q baseband signal, each I baseband signal and each Q baseband signal being successively designated with a number so that the Q baseband signals are individually designated as even numbered Q baseband signals or odd numbered Q baseband signals and so that the I baseband signals are individually designated as even numbered I baseband signals or odd numbered baseband signals;
grouping the odd numbered I baseband signals, the even numbered I baseband signals, the odd numbered Q baseband signals, and the even numbered Q baseband signals to form an
I odd/Q even group comprised of odd numbered I baseband signals and even numbered Q baseband signals and an
I even/Q odd group comprised of even numbered I baseband signals and odd numbered Q baseband signals;
restoring the missing even numbered I baseband signals and the odd numbered Q baseband signals in the I odd/Q even group by duplicating each of the odd numbered I baseband signals and the each of the even numbered Q baseband signals to form restored I even signals and restored Q odd signals resulting in both I odd, I even, Q odd, and Q even components being organized as an imaginary baseband signal group;
restoring the missing odd numbered I baseband signals and the even numbered Q baseband signals in the I even/Q odd group by negating each of the even numbered I baseband signals and the each of the odd numbered Q baseband signals to form restored I odd signals and restored Q even signals resulting in both I odd, I even, Q odd, and Q even components being organized as a real baseband signal group;
generating a plurality of carrier signals, each of the plurality of carrier signals having a frequency different from the frequency of the other carrier signals, and the frequency difference between adjacent carrier signals is equal to substantially the reciprocal of the period of the signal frame;
modulating a carrier signal with one of the signals from the imaginary baseband signal group to form an imaginary frame waveform;
modulating a carrier signal with one of the signals from the real baseband signal group to form a real frame waveform, the real frame waveform having a sine wave envelope level which is at a substantially zero value at the frame boundary and the imaginary frame waveform having a cosine wave envelope level which is at a substantially maximum value at the frame boundary;
staggering the imaginary frame waveform to form a staggered imaginary frame waveform which is delayed one half frame period relative to the real frame waveform so that the envelope level of the staggered imaginary frame waveform is at substantially zero at the imaginary frame boundary;
adding together the staggered imaginary frame waveform and the real frame waveform; and
transmitting the added imaginary frame waveform and the real frame waveform onto a communication channel.

* * * * *